United States Patent

Caroli

[11] Patent Number: 5,565,221
[45] Date of Patent: Oct. 15, 1996

[54] SPACING MEANS FOR REFLEX PIN BLOCK

[75] Inventor: Italo Caroli, Westmount, Canada

[73] Assignee: DBM Reflex Enterprises Inc., Quebec, Canada

[21] Appl. No.: 387,811

[22] PCT Filed: Sep. 30, 1993

[86] PCT No.: PCT/CA93/00389

§ 371 Date: Feb. 27, 1995

§ 102(e) Date: Feb. 27, 1995

[87] PCT Pub. No.: WO95/01249

PCT Pub. Date: Jan. 12, 1995

[30] Foreign Application Priority Data

Jun. 30, 1993 [CA] Canada ................... 2099456

[51] Int. Cl.⁶ .................. B29C 33/30; B29D 11/00
[52] U.S. Cl. .................. 425/190; 249/165; 249/166;
264/1.9; 359/530; 425/469; 425/808; 425/DIG. 30
[58] Field of Search ................... 425/182, 186,
425/190, 192 R, 808, DIG. 30, 469; 249/139,
165, 166; 264/1.9, 2.5; 359/530

[56] References Cited

U.S. PATENT DOCUMENTS

| | | | |
|---|---|---|---|
| 1,906,655 | 5/1933 | Stimson | 264/1.9 |
| 1,925,096 | 9/1933 | Hunter | 264/1.9 |
| 2,897,346 | 7/1959 | Stevens . | |
| 3,038,065 | 6/1962 | Franck et al. . | |
| 3,040,168 | 6/1962 | Stearns . | |
| 3,258,840 | 7/1966 | Hedgewick et al. | 264/2.5 |
| 3,348,037 | 10/1967 | Taltavull . | |
| 3,363,875 | 1/1968 | Hedgewick et al. | 249/117 |
| 3,382,354 | 5/1968 | Hedgewick et al. . | |
| 3,422,260 | 1/1969 | Hedgewick . | |
| 3,649,153 | 3/1972 | Brudy | 425/808 |
| 3,739,455 | 6/1973 | Alvarez | 264/2.5 |
| 4,177,505 | 12/1979 | Carel | 362/309 |
| 4,422,133 | 12/1983 | Elmer | 362/277 |
| 4,451,875 | 5/1984 | Odle et al. | 362/297 |
| 4,528,617 | 7/1985 | Blackington | 362/32 |
| 4,733,946 | 3/1988 | Cossetti | 350/321 |
| 4,737,896 | 4/1988 | Mochizuki et al. | 362/301 |
| 4,781,870 | 11/1988 | Talbert | 264/1.9 |
| 4,905,133 | 2/1990 | Mayer et al. | 362/346 |
| 5,034,867 | 7/1991 | Mayer | 362/297 |

FOREIGN PATENT DOCUMENTS

| | | |
|---|---|---|
| 759323 | 5/1967 | Canada . |
| 817250 | 7/1969 | Canada . |
| 823521 | 9/1969 | Canada . |
| 844488 | 6/1970 | Canada . |

Primary Examiner—Jay H. Woo
Assistant Examiner—Joseph Leyson
Attorney, Agent, or Firm—Sughrue, Mion, Zinn, Macpeak & Seas

[57] ABSTRACT

Spacers or wedges are disclosed for use in combination with mold elements such as lens and/or reflex reflector pins in a pin block or matrix assembly. Such assemblies are used in the manufacture of molds for producing, for example, front and/or rear light units for motor vehicles. The wedges or spacers are selectively located between rows or banks of reflex or optic pins to provide required orientation to selected groups of the pins so that the necessary reflectivity of the finished product is provided in the curved portion thereof.

7 Claims, 5 Drawing Sheets

SPACING MEANS FOR REFLEX PIN BLOCK

FIELD OF THE INVENTION

This invention relates to mold matrix assemblies used in the manufacture of reflex reflector and lens units such as, for example, front and rear light units on automobiles. In particular, the invention is directed to spacing means for use in such matrix assemblies and the combination of the spacing means with mold elements in a matrix.

BACKGROUND OF THE INVENTION

A reflective mold matrix consists of a plurality of mold pins such as optic pins or reflex pins that are assembled into a specific configuration. The matrix is used to produce an electroform block, by electroplating, and this block is then used in the manufacture of a mold which receives thermoplastic mold material, under pressure, for making optic and reflective devices, for example automobile light assemblies. The reflective prisms in a light assembly are the result of reflector or reflex mold pins used to reflect light back to a source directed at the light assembly and the optic elements therein may be used, for example, as directional signalling running and stop lights.

Some years ago, light assemblies on vehicles were generally flat, or located on flat areas of the vehicles, with reflective portions of the light assemblies often being incorporated in the bodywork of the vehicle. In many examples, the generally planar outer surfaces of the reflectors of the light assemblies were perpendicular to the longitudinal axis of the vehicle, or nearly so. However, in recent years, surfaces of vehicle bodies have been rounded off to provide more dramatic contours in an attempt to lower wind resistance and reduce surface friction and drag.

Accordingly, aerodynamics is playing an increasing role in the design and overall configuration of motor vehicles and this has presented challenges in the manufacture of light assemblies, for example front and rear light assemblies, in that those products must not only conform to or blend with the contour of the vehicle bodywork but still provide the reflectivity and optical standards required by law.

It is desirable therefore in the manufacture of a reflective mold matrix to find some way of orienting the mold elements so that the necessary reflectivity of the finished product is not lost in the curved portion thereof while matching the contour of the vehicle body.

An example of one attempt of meeting the requirement is shown in U.S. Pat. No. 4,733,946 of Mar. 29, 1988 to Cossetti. In this patent, reflex pins are machined such that their side surfaces are tapered towards the face of the matrix so that when the elements are grouped in a matrix, the tapered pins will provide the necessary curvature. However, while this may be effective, it is an expensive and time consuming way of dealing with the matter.

SUMMARY OF THE INVENTION

The present invention addresses the problem referred to above by providing spacers or wedges for use in combination with mold elements such as optic or reflex reflector pins, in the pin block or matrix assembly. The spacers or wedges are selectively located between rows or banks of mold elements in the matrix to provide the required orientation to the optic reflex pins. The result of this is that the necessary reflective surfaces from the prisms will return the required amount of reflected light towards a source even when the surface of the product is on a contoured portion of a light assembly on a vehicle.

According to one broad aspect, the invention relates to a wedge-shaped spacer for use in combination with mold elements in a matrix assembly, the spacer being selectively located between rows or banks of the mold elements to provide orientation to the elements on one side of the spacer with respect to those elements on the other side thereof thereby to compensate for axial changes in the orientation of the mold elements resulting from curvature of the matrix. The spacer comprises an elongated body having flat parallel side edges and converging faces tapering towards one another from a major edge to a minor edge. One of the faces has a surface profile to fit the profile of juxtaposed elements in the matrix assembly.

According to a further broad aspect, the invention relates to a mold element matrix assembly for use in manufacturing a mold for producing a contoured, vehicle light unit. The assembly comprises a plurality mold elements in the form of elongated optic and/or reflex pins with operative ends, the pins being secured together in a block to provide a contoured matrix surface. At least one wedge-shaped spacer having a major end and a minor end, is inserted in the assembly, the spacer having a width equal to the thickness of said matrix and being located with its minor end adjacent the matrix surface and between banks of the mold elements whereby the longitudinal axis of the mold elements on one side of the spacer are disposed at an angle relative to the elements on the other side of the spacer.

BRIEF DESCRIPTION OF THE DRAWINGS

The invention is illustrated, by way of example, in the accompanying drawings in which.

DETAILED DESCRIPTION OF THE INVENTION

Figure 1:
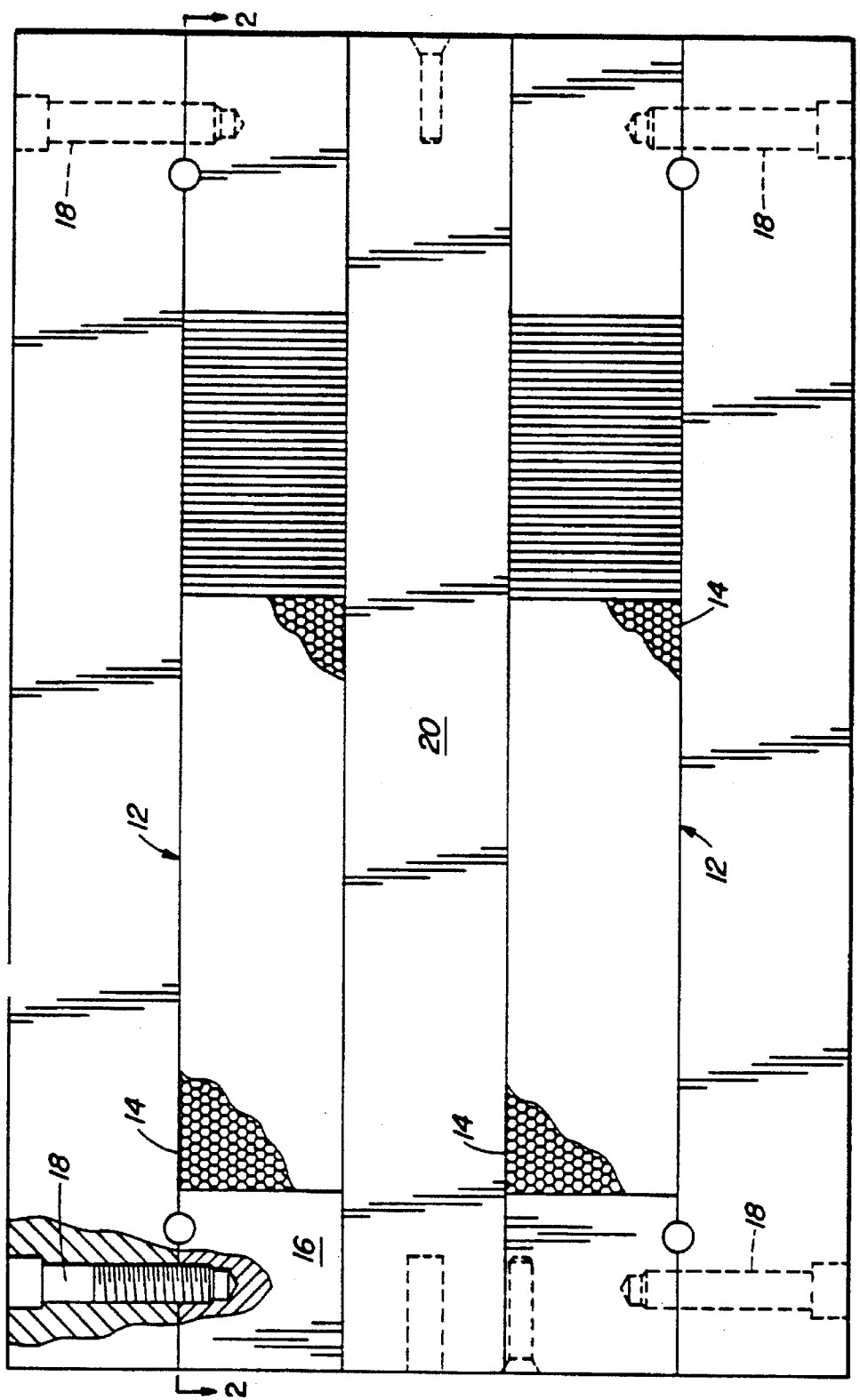
FIG. 1 is an elevation view of an operative face of a matrix assembly according to the invention.
Figure 2:
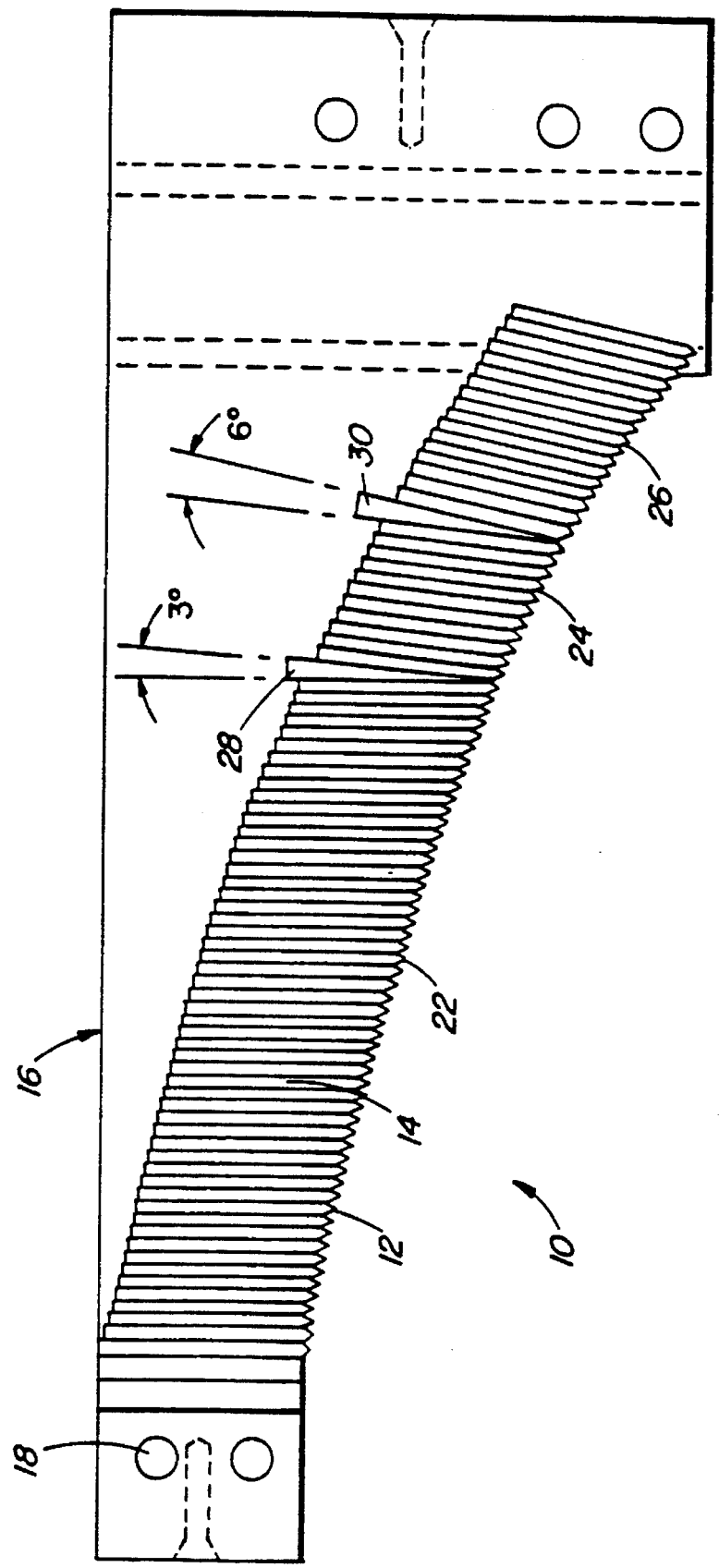
FIG. 2 is a sectional view taken along the line 2—2 of FIG. 1.
Figure 3:
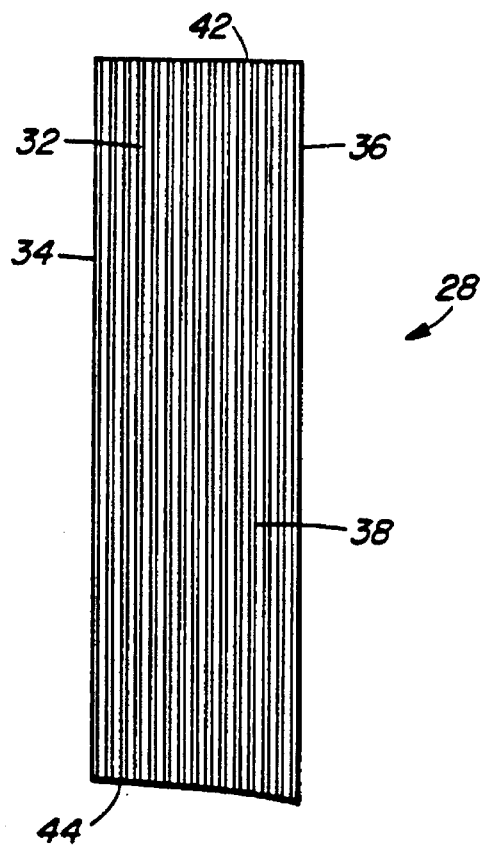
FIG. 3 is a plan view of a wedge-shaped spacer of the type shown in FIG. 1.
Figure 4:
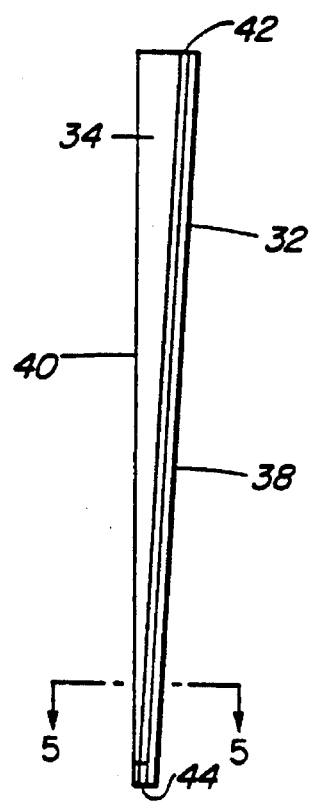
FIG. 4 is a side view of the spacer shown in FIG. 3.
Figure 5:
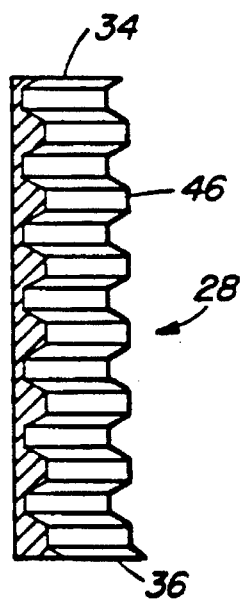
FIG. 5 is a sectional view taken along the line 5—5 of FIG. 4 and looking toward the minor end of the spacer shown in FIG. 4.
Figure 6:
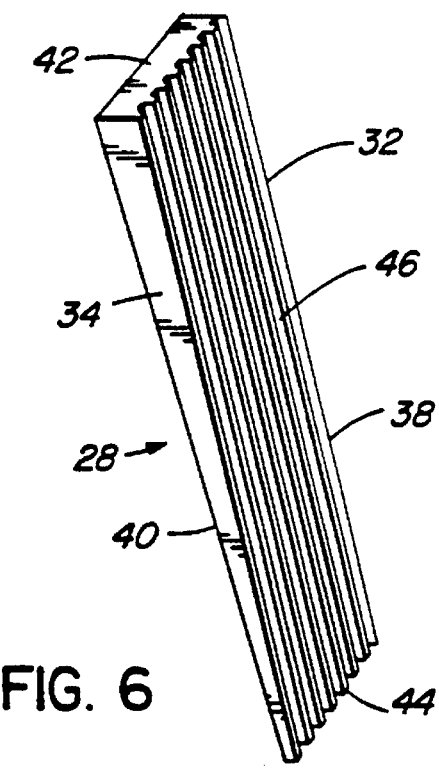
FIG. 6 is a perspective view of the spacer shown in FIG. 3.

Referring to FIGS. 1 and 2, a mold element matrix assembly 10 consists of a pair of groups 12 of elongated pins or mold elements 14 suitably secured together and held in a carrier 16 by cap screws 18 or the like. In the illustration of FIG. 1, two groups of mold elements, one in the upper part of the carrier and one in the lower part of the carrier are separated by a relatively thick intermediate member 20.

As shown in FIG. 2, the matrix surface 22 displays a concave contour, the degree of curvature thereof increasing towards the right hand side of FIG. 2. The pins 14 in group 12 are separated from pins 24 and 26 by two wedge-shaped spacers 28 and 30 respectively. Typically, spacers 28 and 30 would be of the configuration shown in FIGS. 3–6 inclusive. FIG. 2 shows that wedge-shaped spacer 28 serves to offset the longitudinal axes of the pins 24 by about 3° with respect to the longitudinal axes of pins 14 in group 12. Further, wedge-shaped spacer 30 adds a further offset of approximately 6° between mold pins 24 on one side thereof and mold pins 26 on the other side thereof.

As seen in FIGS. 3–6, the wedge-shaped spacer 28 has an elongated body 32 with flat, parallel side edges 34, 36 and converging faces 38, 40 that taper towards one another from a major edge 42 to a minor edge 44.

It will be appreciated that the design of the matrix will dictate the configuration of the pins or elements 14, 24, 26 being used. However, as an example, pins or elements 14 in group 12, as shown in FIG. 1, have a hexagonal cross-section while the pins in group 24, for example, may be of rectangular cross-section. In such an arrangement, the wedge-shaped spacer 28 would have one of its faces, in this case, face 38, being provided with a surface profile 46 to compliment the profile of the juxtaposed elements 14 adjacent to it in the matrix assembly. As the pins or elements 24 on the other side of the wedge-shaped spacer 28 would be of rectangular configuration, they would fully engage the flat, planar face 40 of the spacer 28.

Figure 8:
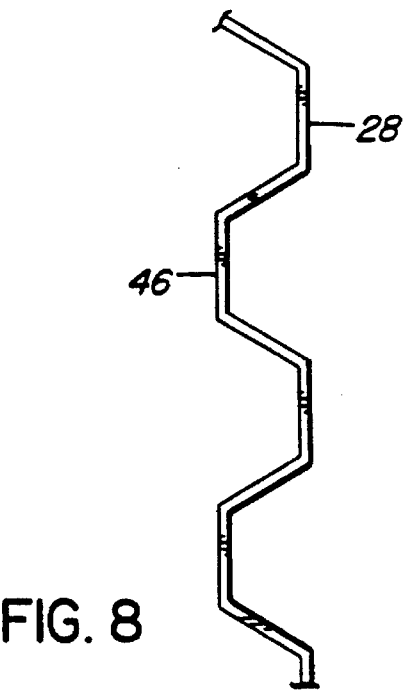
FIG. 8 is a fragmentary end view of one form of a spacer according to the invention.

FIG. 8 is an enlarged view of a portion of the minor end 44 of a spacer 28 showing the profile 46 to compliment the arrangement of the hexagonal cross-section pins.

Figure 7:
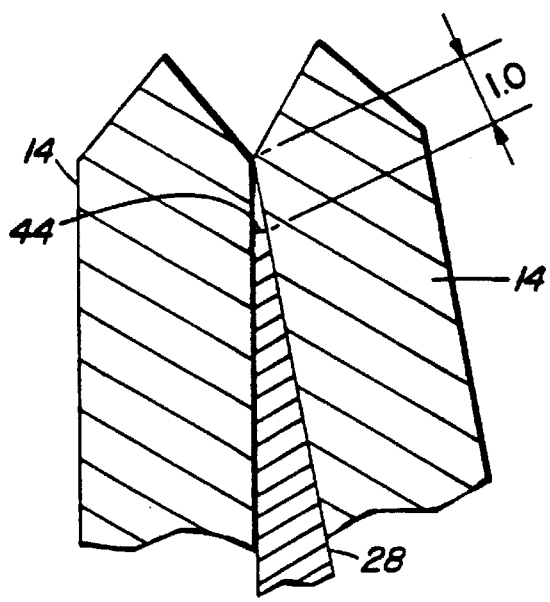
FIG. 7 is a fragmentary, sectional plan view of a pair of mold elements with a spacer therebetween.

FIG. 7 shows the relationship between the minor end 44 of a spacer 28 located between two banks of reflex pins 14. The terminal, minor end 44 of the spacer is located inwardly of the shoulder portions of the pins 14 so that the shoulders engage one another as illustrated.

Figure 10:
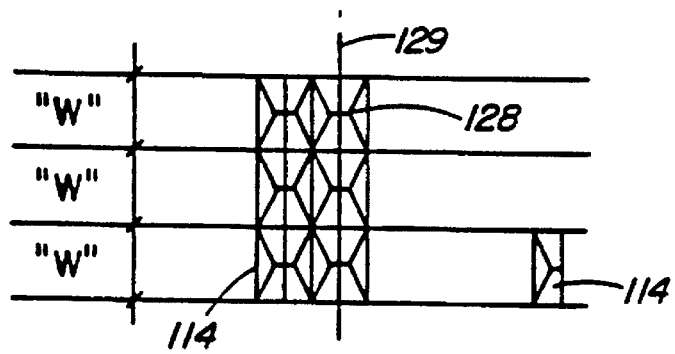
FIG. 10 is a schematic face end view of the pins in FIG. 9.
Figure 9:
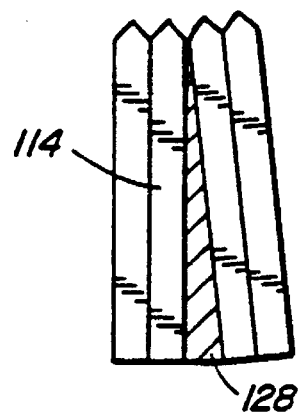
FIG. 9 is a plan view of a group of rectangular reflex pins.
Figure 11:
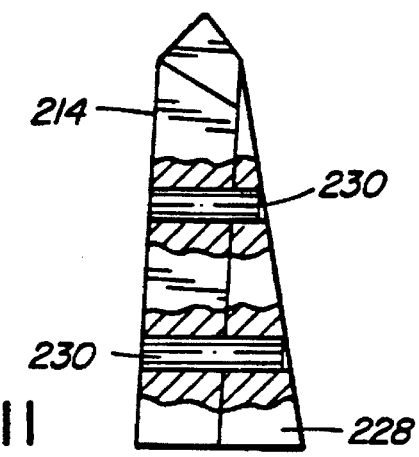
FIG. 11 is a plan view of a further embodiment of the invention.

FIGS. 9, 10 and 11 illustrate embodiments where selected mold elements are oriented with respect to adjacent elements by means of individual spacers. Generally, when spacers are used between rectangular mold elements, both reflex and optic individual spacers are used and which have a width equal to that of one mold element. As shown in FIGS. 9 and 10, individual spacers 128 having a width "W" can be located along straight lines, such as 129, across the width of the matrix or staggered (not shown) if this works better with the profile of the lens.

The individual spacers are aligned to each mold element and, as shown in FIG. 11 spacers 228 are sometimes secured to their associated pins 214 by suitable fastening means such as two small pins 230.

It will be appreciated that as many wedge-shaped spacers that are necessary can be used in a matrix to meet the requirements of orientation of the pins therein.

While the invention has been described in connection with a specific embodiment thereof and in a specific use, various modifications thereof will occur to those skilled in the art without departing from the spirit and scope of the invention as set forth in the appended claims.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the invention claims.

The embodiments of the invention in which an exclusive property or privilege is claimed are defined as follows:

1. A wedge-shaped spacer for use in combination with mold elements in a matrix assembly, said spacer being selectively located between rows or banks of said mold elements to provide selective orientation to said elements on one side of said spacer with respect to those elements on the other side thereof thereby to compensate for axial changes of said mold elements resulting from curvature of said matrix;

said spacer comprising an elongated body having flat parallel side edges and converging faces tapering towards one another from a major edge to a minor edge; at least one of said faces having a surface profile to complement the profile of juxtaposed elements in said matrix assembly.

2. A mold element matrix assembly for use in manufacturing a mold for producing a contoured lens or reflector unit, said assembly comprising a plurality of elongated pins or elements with operative ends, and said elements being secured together in a block to provide a contoured matrix surface; and at least one wedge-shaped spacer in said assembly and having a major end and a minor end, said spacer having a width equal to the thickness of said matrix and being located in said assembly with its minor end adjacent the matrix surface and between banks of said pins or elements whereby the longitudinal axes of the pins or elements on one side of the spacer are disposed at an angle relative to the pins or elements on the other side of the spacer.

3. A matrix assembly according to claim 2 wherein the minor end of said spacer sits inwardly of the matrix surface.

4. A matrix assembly according to claim 2 wherein said spacer has a profile on one of its faces to complement the profile of juxtaposed pins or elements in said assembly.

5. A wedge-shaped spacer for use in combination with mold elements in a matrix assembly, said spacer being selectively located between rows or banks of said mold elements to provide selective orientation to said elements on one side of said spacer with respect to those elements on the other side thereof thereby to compensate for axial changes of said mold elements resulting from curvature of said matrix;

said spacer comprising an elongated body having flat parallel side edges and flat converging faces tapering towards one another from a major edge to a minor edge; said mold elements in said matrix assembly on either side of said spacer being rectangular in cross-section, said spacer being of the same width as the adjacent mold elements.

6. A mold element matrix assembly for use in manufacturing a mold for producing a contoured lens or reflector unit, said assembly comprising a plurality of elongated pins or elements with operative ends, and said elements being secured together in a block to provide a contoured matrix surface; and at least one wedge-shaped spacer in said assembly and having a major end and a minor end, said spacer having a width equal to the thickness of adjacent elements in said matrix and being located in said assembly with its minor end adjacent the matrix surface and between banks of said pins or elements whereby the longitudinal axes of the pins or elements on one side of the spacer are disposed at an angle relative to the pins or elements on the other side of the spacer;

the mold pins or elements on either side of each spacer being rectangular in cross-section and an individual spacer, of the same width of said elements, being associated with a single mold pin or element on either side thereof.

7. A mold element according to claim 6 wherein the individual spacers aligned to each mold pin or element are mechanically secured thereto.

* * * * *